United States Patent [19]

Weissler

[11] 3,894,218

[45] July 8, 1975

[54] VARIABLE INVERSE PERIOD TIMER

[75] Inventor: Harold E. Weissler, Newport News, Va.

[73] Assignee: The Bendix Corporation, Southfield, Mich.

[22] Filed: Mar. 14, 1974

[21] Appl. No.: 451,260

[52] U.S. Cl. ...... 235/150.3; 235/150.2; 235/151.32; 303/21 CE
[51] Int. Cl.² ........................................ G06F 15/20
[58] Field of Search ......... 235/150.3, 150.31, 150.2, 235/151.32, 92 CP, 92 MT, 92 TF, 92 F; 246/182 R, 182 B, 182 C, 187 R; 188/181 R, 181 C; 324/178, 166, 168; 303/21 R, 21 CE, 21 CF

[56] References Cited
UNITED STATES PATENTS

| | | | |
|---|---|---|---|
| 3,525,039 | 8/1970 | Mindheim | 235/150.3 X |
| 3,655,962 | 4/1972 | Koch | 235/150.2 X |
| 3,679,879 | 7/1972 | Seki et al. | 235/150.31 |
| 3,804,470 | 4/1974 | Slavin et al. | 188/181 C |

*Primary Examiner*—Joseph F. Ruggiero
*Attorney, Agent, or Firm*—W. G. Christoforo; Bruce L. Lamb

[57] ABSTRACT

A variable inverse period timer computes the inverse period between events, where the repetition frequency of the events can vary greatly. Where the repetition frequency of the events is relatively high the average inverse period of a plurality of events is computed, and where the repetition frequency of the events is relatively low a single inverse period is computed. This is accomplished by providing a digital differential analyzer which generates the locus of possible inverse periods from an initial condition and which is activated a fixed time after the occurrence of a first event. Upon occurrence of an event subsequent to the activation of the digital differential analyzer, the value generated by the digital differential analyzer is essentially multiplied by the number of events which occurred since the first event.

13 Claims, 5 Drawing Figures

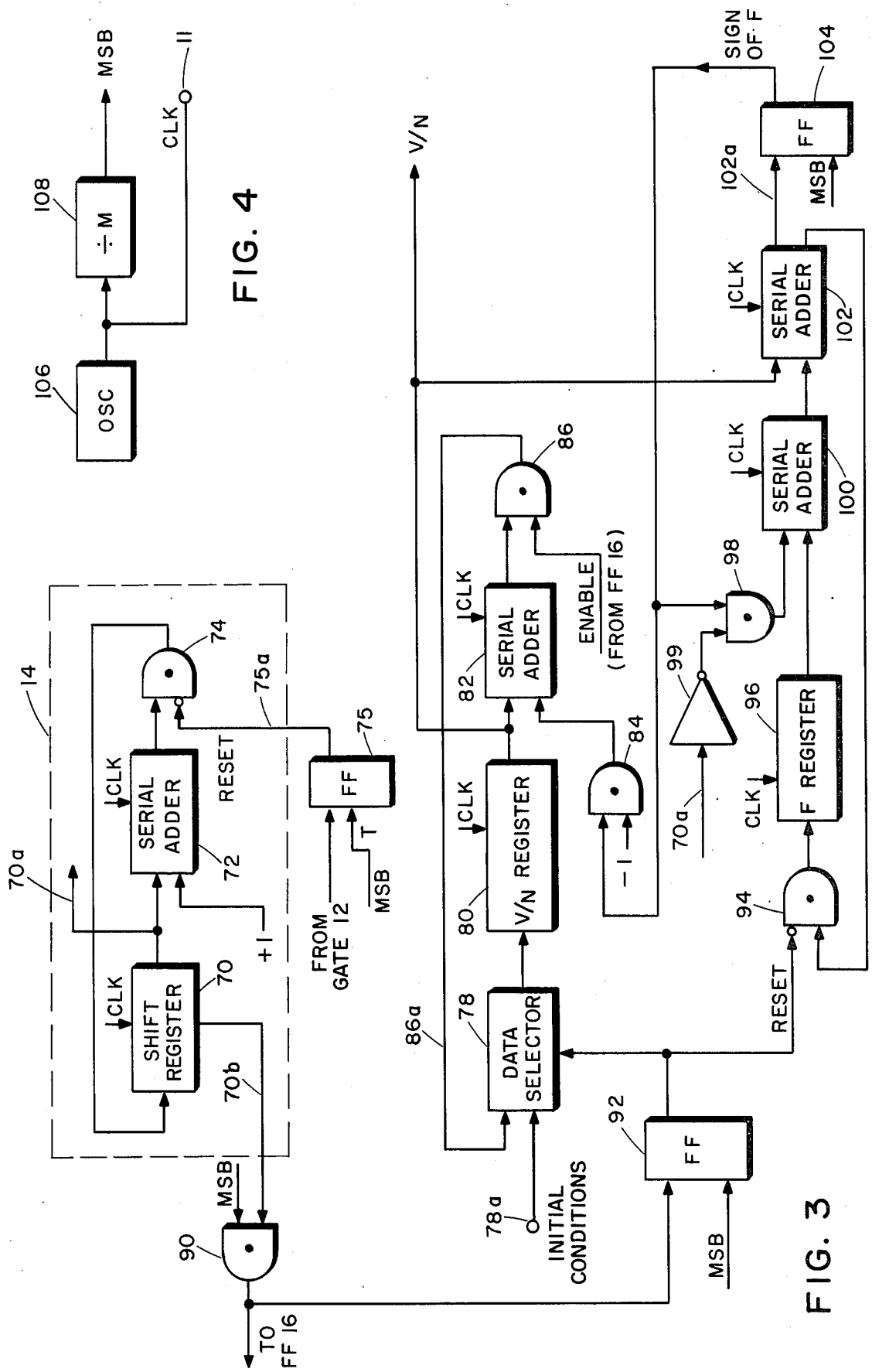

VARIABLE INVERSE PERIOD TIMER

BACKGROUND OF THE INVENTION

This invention relates to digital inverse period timers and particularly to such timers which can compute the inverse period between recurring events where the repetition frequency of the events can vary widely. The invention is especially useful for computing the velocity of a rotating structure of a vehicle such as a drive shaft or a wheel in an adaptive braking system.

The time and hence the period between recurring events, such as zero crossings of a sinusoidal signal, can be digitally obtained by cumulating the number of clock pulses generated between the occurrence of subsequent events in a counter. The average time between events can be obtained by accumulating the number of clock pulses generated during the occurrence of a plurality of events and then dividing the number obtained by the number of events which occurred.

Where the events comprise the zero crossings of a sinusoidal wave such as that obtained from a speed sensor responding to the velocity of a vehicle wheel as is common in adaptive braking systems, the velocity of the wheel can be computed by taking the inverse or the reciprocal of the period. It is particularly advantageous in adaptive braking systems that wheel velocity be computed as rapidly as possible and continuously updated to thus provide rapid response of the overall system. It is, of course, also advantageous that the velocity be computed accurately and represent the actual performance of the vehicle wheel being sensed. In this regard, some difficulty exists since the speed of a vehicle and hence the speed of a wheel can vary anywhere from zero to 90 or 100 miles per hour in a practical automotive vehicle. Since the repetition frequency of a speed signal generated by a speed sensor is proportional to the speed of the sensed structure, it can be seen that the repetition frequency of events which represent the speed signal will vary over wide limits. For example, for a rapidly rotating wheel the repetition frequency of the events which represent the wheel speed will be quite high while the time period between events will be quite small. In this case, any errors or noise attendant in obtaining the period between events or the reciprocal of the period between events will result in rather large errors. It would thus be advantageous to obtain the period or reciprocal of the period over a plurality of events. On the other hand, where the wheel speed is low the time between events will be quite long but the effect of noise or errors will be relatively less influential. In addition, in the latter example, if the average inverse period were computed only after sensing a plurality of events, wheel velocity would be computed relatively less often. Thus, in this latter case, it is advantageous to compute wheel velocity upon the occurrence of each event, while if wheel speed is high, wheel velocity can be computed after a plurality of events and still obtain updated computed velocity relatively often.

SUMMARY OF THE INVENTION

It is thus an object of this invention to provide in an adaptive braking system digital means for computing the velocity of a wheel or a drive shaft or other similar structure of a vehicle.

It is another object of this invention to provide means to compute this velocity by detecting the period of a series of events whose repetition frequency can vary widely and to obtain the velocity rapidly and accurately.

Another object of this invention is to provide a means of the type described for use in a vehicle adaptive braking system and which makes use of a digital differential analyzer for converting period between events to an equivalent velocity.

These and other objects of the invention are accomplished by providing a speed sensor which is ganged to a structure of the vehicle, such as a wheel or the drive shaft or some combination of wheels and which produces a speed signal which represents the velocity of the sensed structure. The speed signal obtained from the speed sensor will normally comprise a train of identifiable events such as in the case of a sinusoidal speed signal, the zero crossings and for a pulsed speed signal, the actual pulses. Upon the occurrence of a first of these events a register or counter which accumulates pulses from a clock is reset to an initial value. In addition, another counter will be reset to an initial value and this counter will subsequently record the number of events that occur until the next reset of the counter. A signal corresponding to the occurrence of an event will be applied to these two counters through a latching gate means which is latched closed immediately after the first event occurs. Upon the first register attaining a predetermined state or condition, a digital differential analyzer is enabled which begins to generate an equivalent velocity curve from a predetermined initial value. Upon the occurrence of an event subsequent to the enabling of the digital differential analyzer the contents of the analyzer is sampled and multiplied by the number of events which occurred since the first event to produce the equivalent velocity signal. It should be obvious from this preliminary description that should the repetition frequency of the events be relatively high a number of subsequent events will occur before the digital differential analyzer is enabled so that the final velocity signal will be computed over a plurality of events. However, where the repetition frequency of events is relatively low, the digital differential analyzer will be enabled before a subsequent event occurs and the velocity signal computed upon the occurrence of a subsequent event.

BRIEF DESCRIPTION OF THE DRAWINGS

FIG. 3 is a block diagram of a digital differential analyzer which can be used with the invention.

FIG. 4 illustrates means for generating signals for synchronizing various elements of the invention.

DESCRIPTION OF THE PREFERRED EMBODIMENT

Figure 2:
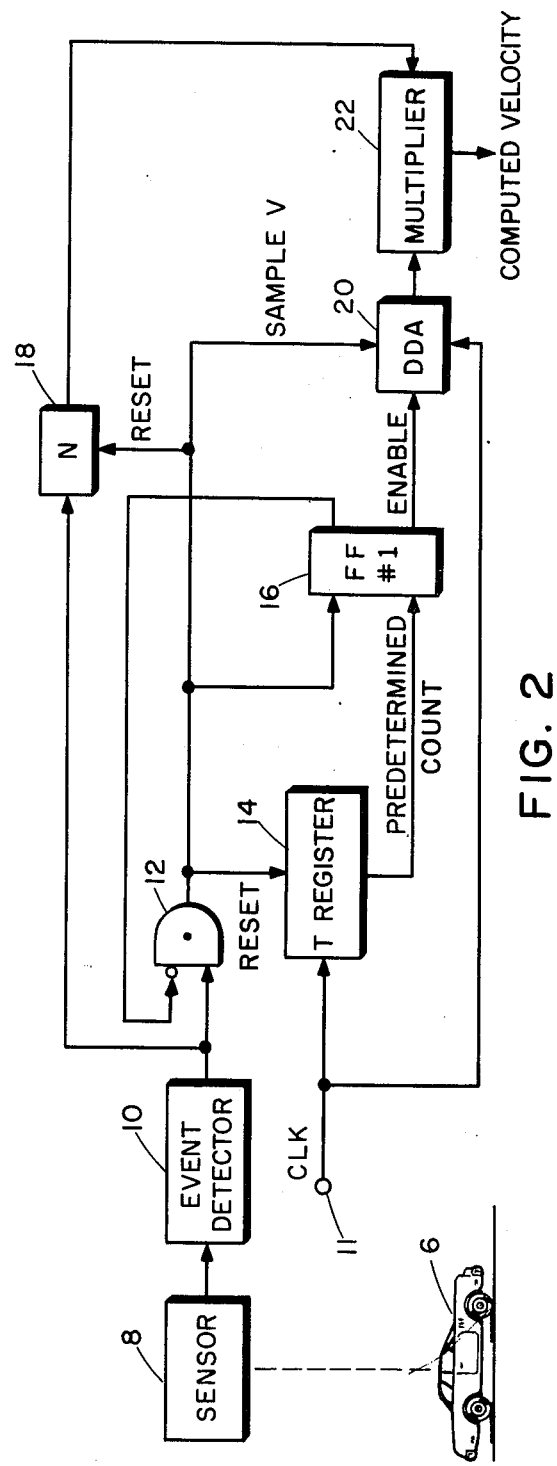
FIG. 2 is a simplified block diagram which illustrates the principles of the invention.

Refer first to FIG. 2 where a speed sensor 8 is ganged to a vehicle 6 and more particularly to a wheel, drive shaft or other portion of the vehicle from which speed can be sensed. For example, speed sensors of the type known to those skilled in the art include a rotor which is ganged to a vehicle wheel and whose rotational speed is directly proportional to the rotational speed of the wheel, the sensor being similar to a tachometer to generate a sinusoidal signal whose frequency is related to the rotational speed of the sensed wheel. Other types of sensors known to those skilled in the art comprise a toothed rotor wherein the sensor generates a pulse train output whose pulse repetition frequency is related to the rotational speed of the sensed structure. In any event, sensors of this type are well known to those skilled in the art and the exact form of the sensor is not a portion of the invention, it only being required that a sensor be used which generates a speed signal having identifiable portions. These identifiable portions are herein termed events. The speed signal from sensor 8 is applied to an event detector 10, if required, which for a sinusoidal signal can comprise means for detecting zero crossings in a certain direction and for a pulsed speed signal might comprise a differentiator. Again, the exact form of the event detector 10 is not essential to the operation of the invention, it only being necessary that the output from detector 10 be comprised of signals whose repetition frequency is proportional to the sensed speed and which are suitable to be used in digital circuitry to be described. The signal from event detector 10 is applied as one input to an inhibited latching AND gate 12 whose second input signal, the inhibit signal, is obtained from the set output terminal of flip-flop 16. It is assumed that upon occurrence of a first signal or event from detector 10 that flip-flop 16 is in a reset state and hence gate 12 is open. With gate 12 open the first event passes therethrough to reset T-register 14 and counter 18. In addition, flip-flop 16 is triggered into its set state so that it applies a signal to the inhibit input terminal of gate 12 thereby effectively closing that gate. Clock pulses from a source not shown are applied at a terminal 11 and hence to register 14. These clock pulses now count the register up from its reset state. It can also be seen that terminal 11 is connected to the digital differential analyzer 20 of which T-register 14 can comprise a part and which is enabled by the reset signal from flip-flop 16. Since at the present time this flip-flop is in the set state digital differential analyzer 20 is not enabled and hence the clock pulses at terminal 11 are not effective thereat. Register 14 in response to the clock pulses at terminal 11 counts until it attains a predetermined count at which time it generates a signal which is applied to the flip-flop 16 reset trigger terminal. The flip-flop accordingly is thereby reset thus extinguishing the output signal at its set terminal and thereby allowing gate 12 to open and in addition the signal at its reset output terminal enables the digital differential analyzer 20 so that it thereafter responds to the clock pulses at terminal 11. It should be noted that register 14 attains its predetermined count a predetermined time after the occurrence of the first event and, since gate 12 is closed, events occurring before the register reaches its predetermined count are ineffective with respect to register 14 and digital differential analyzer 20. However, events occurring subsequent to the first event but before gate 12 is open are accumulated in counter 18. The next event that occurs after gate 12 opens comprises the last event of the current computation period and also the first event of the next computation period in that it passes through gate 12 and effectively samples the instantaneous state of digital differential analyzer 20, with the sample being applied to a multiplier 22 where it is multiplied by the number accumulated in counter 18, that is, the number of events which occurred during the current computation period. The result from multiplier 22 comprises the computed velocity of the sensed structure. In addition, this event resets register 14 and counter 18 and sets flip-flop 16 to inhibit gate 12 so that the system is in its initial condition; at the beginning of another computation period.

Figure 1:
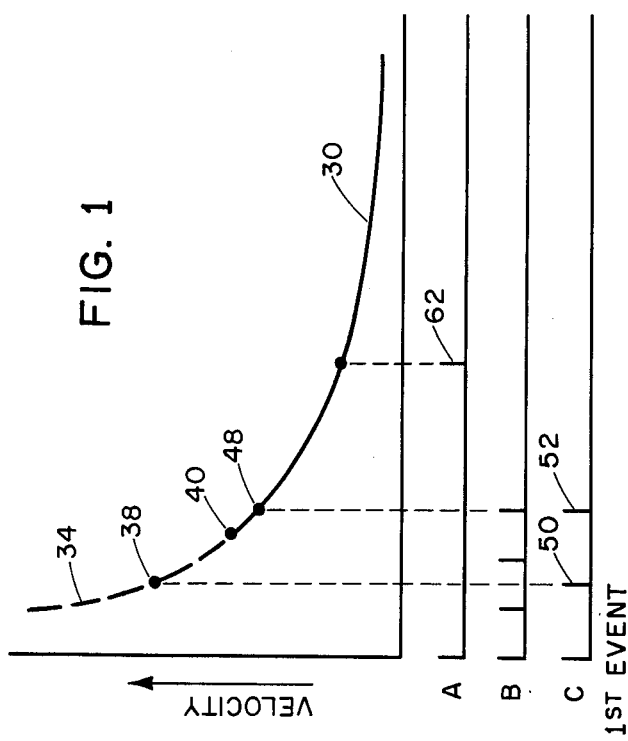
FIG. 1 is a curve generated by a digital differential analyzer which shows the locus of computed velocity against the period of events.

Refer now to FIG. 1 where a curve 30 illustrates the output signal from digital differential analyzer 20 of FIG. 2 and comprises the velocity of the sensed structure slotted against the occurrence of events starting with the first event. A point 40 corresponds to the initial state of the digital differential analyzer at the time the predetermined count of register 14 is attained. The dashed curve 34 also corresponds to velocity of the sensed structure but does not comprise an output of the digital differential analyzer. For example, and assuming that the first event always occurs at the origin of the curve, assume that events occur as shown at line C and the next event occurs at a time corresponding to event 50. The velocity of the sensed structure would be found on curve 34 at point 38. However, since the predetermined count of register 14 is attained at a time corresponding to point 40, and event 50 occurred before the predetermined count had been attained, then the velocity of the sensed structure will not be computed upon the occurrence of event 50. However, event 50 will be recorded in counter 18 which therefrom attains a count of one. The subsequent event of this example is shown as event 52 which occurs after point 40 and corresponds to point 48 on curve 30. At this time, the predetermined count has previously been attained so that the state of the digital differential analyzer is sampled and multiplied by the number accumulated in counter 18, which in this example is now two. The repetition frequency of events as illustrated at line C might correspond to a moderately fast sensed structure. Line A illustrates the occurrence of events in response to a slowly rotating structure. In this example event 62 is the next event after the first event and occurs after the occurrence of point 40 so that the contents of digital differential analyzer 20 is divided by unity and the wheel velocity directly obtained. Line B illustrates the events occurring in response to a rapidly rotating structure. In this case, a relatively large plurality of events occurs before point 40 is reached so that the contents of the digital differential analyzer, when sampled, are divided by a relatively large number, thus resulting in a computed velocity corresponding with the rapidly rotating structure.

It should be noted that the digital differential analyzer of FIG. 2 can be permanently enabled in which case the occurrence of a first event passing through gate 12 will not only sample its state but also reset it to some initial condition. Thereafter, the digital differential analyzer would generate the function corresponding to curves 34 and 30 of FIG. 1. In any event, the digital differential analyzer would not be sampled until after an arbitrary time, such as corresponding to point 40. The present embodiment, that is where the digital differential analyzer is enabled and set to an initial condition by flip-flop 16, is preferred over the alternate embodiment because of the economies which can be obtained by not generating curve 34, which is unnecessary for the operation of the invention. In addition, the present embodiment provides improved resolution for a given clock frequency.

Also note that the event repetition frequency is directly proportional to velocity, or in other words, the event period is invesely proportional to velocity.

Refer now to FIG. 3 which illustrates a block diagram of a digital differential analyzer which can be used with the invention. The digital differential analyzer is seen to include the T-register 14 previously shown in FIG. 2. The T-register includes a shift register 14, a serial adder 72 and an inhibited AND gate 74. T-register 70 comprises a circulating memory wherein the information in shift register 70 is retained by constantly circulating the data therein. Specifically, the data in shift register 70 is circulated from its output through serial adder 72 and gate 74 back into its input. The digital differential analyzer comprises two additional circulating memories which include a V/N register 80 and an F register 96. Each of the three registers comprising the digital differential analyzer have the same storage capacity: M bits. As well known to those skilled in the art, when using circulating memories it is necessary to provide some sort of means to identify the position of words contained in the memories and to otherwise synchronize the data circulating in the memories. FIG. 4, reference to which should now be made, provides one means for synchronizing and identifying the data in the various circulating memories. In this figure an oscillator 106 generates the clock pulses heretofore discussed which appear at terminal 11. In addition, the clock pulses are applied to a divide by M divider 108. It will be remembered that M is the storage capacity of each of the circulating memories in the digital differential analyzer. Divider 108 accordingly produces a single output pulse having a length of one clock pulse every M clock pulses. This output pulse is termed the most significant bit (MSB) pulse and the occurrence of the MSB pulse signifies in this embodiment that a word circulating in a circulating memory is instantaneously contained in the correct order in its associated shift register.

Returning to FIG. 3, register 14 is reset to zero upon occurrence of the first event in the following manner. The signal corresponding to the occurrence of the first event proceeding through gate 12, as previously described, is applied to the set terminal of flip-flop 75 which is normally in a reset condition. Upon occurrence of the subsequent MSB pulse, which is applied to the toggle terminal of flip-flop 75, that flip-flop generates a set output signal which is applied to the inhibit terminal of gate 74. Gate 74 remains inhibited until the occurrence of the next MSB pulse at which time flip-flop 75 is reset and gate 74 opens. It should thus be obvious that gate 74 is closed during exactly M clock pulses during which time a binary 0 signal appears at the output of that gate and hence at the input to shift register 70. These M binary 0's are clocked into shift register 70 so that this particular circulating memory is reset to a 0 state.

Upon the reopening of gate 74, therefore, the word contained in the circulating memory is comprised of all binary 0's. Thereafter, the word is incremented by 1 each time it circulates through the memory, specifically as it circulates through serial adder 72 where the binary 1 is added thereto from a source not shown. The contents of this circulating memory is, of course, available in serial by a bit fashion at line 70a.

Shift register 70 includes means for continually monitoring the state of the register. Upon occurrence of the aforementioned predetermined count in the shift register line, 70b, which is connected as one input to AND gate 90, becomes energized. A second input to the gate is the MSB pulse. Accordingly, if line 70b becomes energized at the same time the MSB pulse is generated that pulse passes through the gate to reset flip-flop 16 of FIG. 2 as previously discussed.

The second circulating memory includes register 80, the information in which is circulated through serial adder 82, AND gate 86 and data selector 78 back into the input of the register. Data selector 78 is simply gating means which normally permits the information recirculating through the memory, that is the information on line 86a, to re-enter register 80. However, upon application of the set signal from flip-flip 92 to data selector 78 the information on line 86a is interrupted and information on line 78a enters through the data selector 78 into register 80 in response to clock pulses applied thereto. The flip-flop 92 set output pulse is generated when the MSB pulse passes through gate 90, signifying that register 70 has attained its predetermined count. It will be noted that flip-flop 92 is reset by the next MSB pulse, hence, that flip-flop will be in the set state for exactly M clock pulses during which time exactly M bits will be entered into register 80 from line 78a. The information on line 78a is derived from a source not shown but which might comprise some storage means containing the initial count to be entered into register 80 and corresponding to the velocity at point 40 of curve 30 of FIG. 1. An alternate method of supplying initial conditions to register 80 is to scale the system such that the predetermined count in register 70 is equal to the initial conditions to be entered into register 80. If this is done then it is merely necessary to connect line 70a to line 78a.

AT the same time the initial conditions are being set into register 80 the enable signal of flip-flop 16 of FIG. 2 is applied to AND gates 86 to permit circulation of the data in the memory. Upon occurrence of the next MSB pulse flip-flop 92 is reset so that data selector 78 now permits the data on line 86a, that is the recirculating data, to be re-entered into the register.

The set signal from flip-flop 92 is also applied to inhibit AND gate 94 which is contained in the circulating memory which comprises register 96. With gate 94 closed for M counts, register 96 has M binary 0's entered therein, in other words is set to its initial or 0 state. Of course, upon the resetting of flip-flop 92, gate 94 opens and the information in register 96 is permitted to circulate in the memory. The memory including register 96 also includes a serial adder 100 wherein the contents of register 70 as inverted by inverter 99 is added to the contents of register 96 so long as gate 98 is open. The output from adder 100 is summed with the contents of register 80 in another serial adder 102 with the resultant sum being recirculated in the memory. If a carry term results from the addition performed in serial adder 102, a signal is generated on line 102a which is applied to set flip-flop 104. The set output signal is applied to qualify gates 98 and 84. With gate 84 qualified the contents of register 80 are decremented by 1 each time the contents move through serial adder 82. In addition, with gate 98 qualified, the contents of shift register 70 is substrated from the contents of register 96. Upon occurrence of subsequent MSB pulses flip-flop 104 is reset. thus closing gates 84 and 98.

Summarizing the operation of the digital differential analyzer it will be noted that register 70 is incremented and V/N is added to the F register each word period, that is during each period between successive MSB pulses. When register 96 becomes positive, that is when serial adder 102 generates a carry, V/N is decremented and the contents of register 70 are sampled and subtracted from the contents of register 96. It should be noted that the contents of register 70 is always greater than or equal to V/N, the contents of register 80. The digital differential analyzer thus has memorized therein, specifically in register 80 and its associated memory, a binary word which corresponds to the velocity of the sensed structure divided by the number of event periods occurring since the aforementioned first event and this word changes in accordance with the curve 30 of FIG. 1 from the initial conditions.

Figure 5:
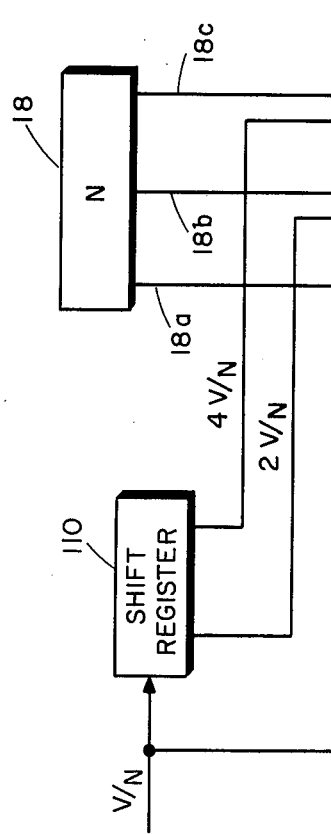
FIG. 5 illustrates a multiplier which can be used with the invention.

Refer now to FIG. 5 where the V/N signal of FIG. 3 is seen being applied to a shift register 110 and also as one input to an AND gate 112. There is also seen the event counter 18 previously seen in FIG. 2. It is assumed in this particular embodiment that a maximum of seven events will occur between the aforementioned first events. Means for processing V/N signals over more or less events should become obvious to one skilled in the art upon an understanding of this particular figure.

Shift register 110 is basically a cascade of flip-flops, each stage of which delays the binary word comprising the V/N signal by one bit, thus, in effect, multiplying the input signal of a stage by 2. In this particular embodiment shift register 110 is comprised of two flip-flop stages so that a binary work equivalent to 2 V/N is applied as one input to AND gate 114, a binary word equivalent to 4 V/N is applied as one input to AND gate 116, and a binary word equivalent to V/N is applied as aforementioned as one input to AND gate 112.

Counter 18 in this embodiment has a capacity to add to 7 and includes three output lines 18a, 18b and 18c. When counter 18 has recorded a single event line 18a is energized thus qualifying gate 112 and allowing the V/N signal to pass therethrough. When counter 18 has accumulated two counts line 18b is energized qualifying gate 114 and permitting the signal 2 V/N to pass therethrough. In like manner, various of the lines alone or in combination with other of the lines are energized as counter 18 accumulates more counts, the lines being energized to qualify their associated AND gates. The output from the AND gates 114 and 116 is summed in serial adder 118, the output from that adder being applied as input to serial adder 120 where it is summed with the output from gate 112. The output from adder 120 is applied as an input to AND gate 122 which is qualified by the signal on line 75a which is also seen in FIG. 3 to be energized by the output from gate 12 of FIG. 2 and a subsequent MSB pulse. In this manner, exactly M bits are permitted through gate 122 to comprise a serial by bit binary word equivalent to the velocity of the sensed structure.

It should now be obvious that the elements of FIG. 5 allow the addition of the various signals from shift register 110 and the V/N signal to produce the desired output at line 122a. For example, if counter 18 has accumulated five counts then lines 18a and 18c will be energized qualifying gates 112 and 116. Accordingly, the 4 V/N signal will pass through gate 116 and adder 118 to be added to the V/N signal passing through gate 112 in serial adder 120. As another example, if counter 18 has accumulated seven counts, that is N = 7, then gates 112, 114 and 116 will be qualified and the various input signals thereto will be summed to produce the proper signal at line 122a.

Although various embodiments of the invention have been shown herein other modifications and alterations of the invention will now suggest themselves to one skilled in the art. Accordingly, the invention is to be limited only by the true scope and spirit of the appended claims.

The invention claimed is:
1. Means for computing the reciprocal of the period between recurring events comprising:
   means for counting the occurrence of each event;
   a digital differential analyzer including at least a first register responsive to clock pulses applied thereto for accumulating said clock pulses and including means for generating the locus of a point which is instantaneously proportional to the reciprocal of said period when enabled;
   a source of said clock pulses;
   latching gates means responsive to the occurrence of an event when said gate is unlatched for resetting to predetermined states said first register and said means for counting; for sampling said means for generating; and, for latching said gate means, said gate means being non-responsive to the occurrence of events while latched, said gate means including means for unlatching in response to said first register attaining a predetermined first state and additionally including means for enabling said digital differential analyzer in response to said first register attaining said predetermined first state; and,
   means for multiplying the sample obtained from said digital differential analyzer by the number contained in said means for counting, the result of the multiplication comprising said reciprocal.

2. The means for computing of claim 1 wherein said events comprise zero crossings in a predetermined direction of a generally sinusoidal signal.

3. The means for computing of claim 2 including a speed sensor ganged to the rotating structure of a vehicle for generating a speed signal having a frequency correlated to the rotational velocity of said structure, said speed signal comprising said sinusoidal signal.

4. The means for computing of claim 1 wherein said digital differential analyzer comprises second and third registers, said first, second and third registers comprising recirculating memories responsive to said clock pulses.

5. The means for computing of claim 4 including means responsive to said clock pulses for synchronizing the information circulating in said memories.

6. The means for computing of claim 1 wherein said first register comprises a first recirculating memory and wherein said digital differential analyzer also comprises second and third recirculating memories which are normally disabled before said first register attains said predetermined first state, and additionally comprising:
   means responsive to said first register attaining said first predetermined state for enabling said second and third memories and for setting said second and third memories to second and third initial conditions respectively;
   means for subtracting the contents of said first register from the contents of said third memory when in a first state and for adding the contents of said second memory to the contents of said third memory;

means for setting said means for subtracting to said first state only when the results of the subtraction and addition exceed a predetermined amount;

means for incrementing said first register by a fixed quantity synchronously with the subtraction and addition; and, means for decrementing said second memory by a fixed quantity synchronously with the subtraction and addition, the contents of said second memory being a signal proportional to the reciprocal of said period.

7. The means for computing of claim 6 including means for synchronizing the circulation of information in the circulating memories with one another.

8. The means for computing of claim 7 including means for synchronizing the circulation of information in said circulating memories with said means for multiplying.

9. The means for computing of claim 8 wherein said events comprise zero crossings in a predetermined direction of a generally sinusoidal signal.

10. The means for computing of claim 9 including a speed sensor ganged to the rotating structure of a vehicle for generating a speed signal having a frequency correlated to the rotational velocity of said structure, said speed signal comprising said sinusoidal signal.

11. Means for computing the reciprocal of the period between recurring events including at least recurring first events comprising:

means for counting the occurrence of each event, said means for counting being reset to an initial value in response to each said first event;

means for generating the locus of a point which is instantaneously proportional to the reciprocal of said period when enabled, said means for generating being enabled from a predetermined value a predetermined time after the occurrence of a first event;

means responsive to the occurrence of a first event for sampling said means for generating and blocking the response of said means for sampling until said means for generating is enabled; and, means for multiplying the sample obtained by the number contained in said means for counting, the result of the multiplication comprising said reciprocal.

12. The means for computing of claim 11 wherein said events comprise zero crossings in a predetermined direction of a generally sinusoidal signal.

13. The means for computing of claim 12 including a speed sensor ganged to the rotating structure of a vehicle for generating a speed signal having a frequency correlated to the rotational velocity of said structure, said speed signal comprising said sinusoidal signal.

* * * * *